United States Patent [19]

Smollinger

[11] 4,311,920
[45] Jan. 19, 1982

[54] EMERGENCY POWER SOURCE

[75] Inventor: Glenn J. Smollinger, Fairless Hills, Pa.

[73] Assignee: ESB United States, Inc., Wilmington, Del.

[21] Appl. No.: 35,288

[22] Filed: May 2, 1979

[51] Int. Cl.³ .............................................. H02J 9/06
[52] U.S. Cl. ..................... 307/66; 363/134; 320/21
[58] Field of Search ............... 307/66, 46, 48; 363/41, 363/40, 134; 320/21, 59, 2, 5; 322/88; 318/441

[56] References Cited

U.S. PATENT DOCUMENTS

| | | | |
|---|---|---|---|
| 3,673,485 | 6/1972 | Vital | 320/2 |
| 3,946,301 | 3/1976 | Love | 363/134 |
| 3,986,098 | 10/1976 | Tamil | 307/66 |
| 4,065,711 | 12/1977 | Kawabata | 307/66 |

FOREIGN PATENT DOCUMENTS

| | | |
|---|---|---|
| 1176780 | 1/1970 | United Kingdom . |
| 1214880 | 12/1970 | United Kingdom . |
| 1368202 | 9/1974 | United Kingdom . |
| 1465602 | 2/1977 | United Kingdom . |
| 1492750 | 11/1977 | United Kingdom . |

*Primary Examiner*—L. T. Hix
*Assistant Examiner*—Stafford D. Schreyer
*Attorney, Agent, or Firm*—Woodcock, Washburn, Kurtz, Mackiewicz & Norris

[57] ABSTRACT

An emergency power supply designed to furnish sinusoidally varying alternating current to a load under emergency conditions is disclosed. It features a fixed phase shift between input and battery charging waveforms, and intermittent inverter operation under normal (i.e., non-emergency) conditions.

5 Claims, 5 Drawing Figures

$E_s$ - UTILITY VOLTAGE (at 44)
$E_i$ - INVERTER VOLTAGE (across 54)
$E_L$ - INDUCTOR VOLTAGE (across 57)
$I_L$ - INDUCTOR CURRENT (through 57)
$\phi$ - PHASE DIFFERENCE BETWEEN $E_i$ and $E_s$
(introduced by 54)
$\theta$ - PHASE DIFFERENCE BETWEEN $E_i$ and $I_L$
POWER DELIVERED TO BATTERY : $E_i I_L \cos \theta$

EMERGENCY POWER SOURCE

BACKGROUND OF THE INVENTION

This invention relates to the field of emergency power sources which are automatically activated when ordinary utility power supplies fail, as during blackouts. More particuarly, the invention relates to the field of emergency power supplies of the type containing a storage battery which is charged during normal situations and discharged as an emergency supply during power outages.

All such systems have certain elements in common due to the fact that today's utility power is invariably alternating current (hereinafter AC) while there has been no such thing as an AC battery invented as yet. All batteries are direct current (DC). Therefore, to charge a battery from a utility line an inverter must be provided to convert the AC to DC; in order that the battery may supply the usual emergency equipment, which is commonly also AC, a second inverter must be supplied to convert the DC provided by the battery back to AC. This requirement is obviated, of course, if the load to be powered is itself DC; in such cases of course no inverter is required to convert the DC supplied by the battery to AC. If, as in a typical embodiment, the load to be powered under emergency situation is simply incandescent lighting, which may be DC, then no inverter is required. The present invention, however, is not of this type in that it is designed to supply AC loads under emergency conditions. Hence, an inverter is required in the class of devices to which the invention relates to convert the DC stored in the battery to AC.

A related area of prior art involves so-called UPS (uninterrupted power supply) systems. These systems are used as a sort of buffer between utility power and critical components such as modern digital computers, so that if the line voltage for any reason varies slightly or stops for a fraction of a second, power to the load is not lost; it being apparent that in many applications it is essential that power be continuously supplied to the device in question. For example, many modern computers use a type of memory to which power must be continually supplied, lest the information stored therein be lost. Hence, such UPS systems have been devised. The present application, however, is not concerned with such an uninterruptable power supply for reasons which will become clear hereinafter. Instead, the present application is directed towards a circuit and apparatus which is only useful as an emergency power supply. However, it is designed to be a far more efficient and practical emergency power supply than those found in the prior art and for this reason has a range of utility not covered by any prior art devices.

OBJECT OF THE INVENTION

It is therefore an object of the invention to provide an improved emergency power supply.

It is a further object of the invention to provide an emergency power supply at once more efficient and less expensive than those in the prior art.

It is still another object of the invention to provide an emergency power supply which can be manufactured readily and economically and yet which provides performances better than those found in the prior art.

SUMMARY OF THE INVENTION

The present invention satisfies the above listed needs of the art and objects of the invention by its provision of a circuit comprising an inverter providing AC current from a DC battery supply, transfer-switched into a circuit with the load when utility power is lost and being normally connected in series with a filtering choke and the load, and controlled such that the battery is only charged when necessary and a fixed phase difference is introduced between the utility supply voltage and the voltage at the inverter.

BRIEF DESCRIPTION OF THE DRAWINGS

The invention will be better understood if reference is made to the drawings in which.

DESCRIPTION OF THE PREFERRED EMBODIMENTS

Figure 1:
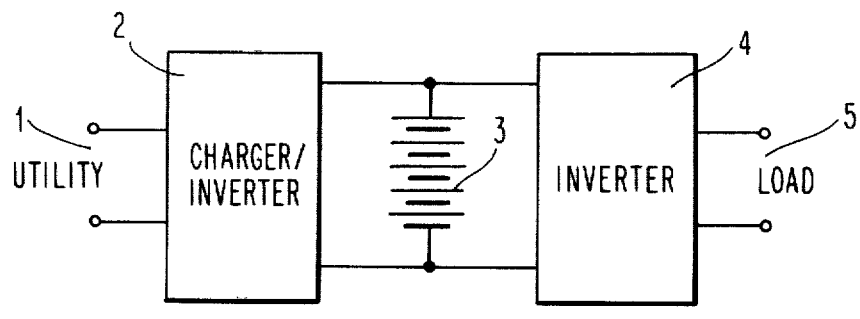
FIG. 1 represents a typical prior art device.

Referring now to FIG. 1, a simple and common prior art scheme for emergency power supplies is shown. Utility power is supplied from ordinary commercial circuitry at terminals 1 and is passed to a battery charger 2 which comprises an inverter and a regulated DC output to the terminals of a battery 3 which is connected across the terminals of a second inverter 4 to change the DC charging current back to AC suitable for supplying the load 5. Clearly when the utility supply is interrupted for any reason, the battery is already connected and can continue to supply the load without interruption. The disadvantage of this design is obvious in that two inverters must be provided. Clearly it would be advantageous to use the same components for both. This defect does not apply to the many emergency power supply applications in which it is not necessary to provide a second inverter since the load is strictly DC, as in, for example, emergency lighting arrangements. In such cases the load 5 would be connected directly across the terminals of the battery 3, the inverter 4 being absent. The present invention is not of this type since it is designed to provide suitable AC power under emergency conditions.

Figure 2:
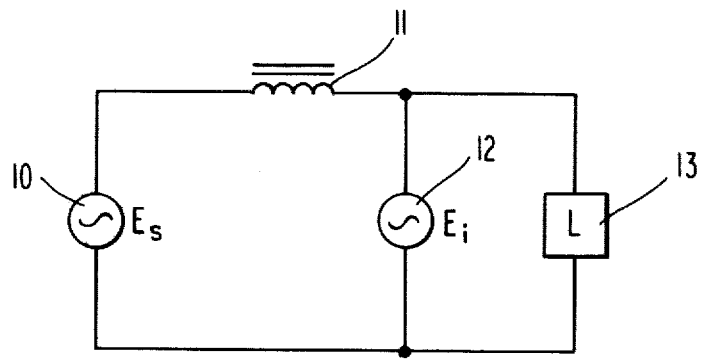
FIG. 2 represents a second prior art device.

FIG. 2 shows a simplified power circuit of a prior art uninterruptable power supply type unit. Input power $E_s$ is supplied at 10, shown schematically as a generator, is filtered by a choke 11 and passed to a load 13. Connected across the terminals of the load is a second source of power 12, denominated $E_i$, comprising an inverter. Within this unit is contained the battery which provides emergency power when, for any reason, $E_s$ is interrupted or lacking. The disadvantage to this design is that the inverter is running constantly because it is used to filter and regulate the power supplied by $E_s$ as well as charge the battery. The fact that the inverter contained within 12 is running constantly means that it must be rather large and able to withstand a considerable amount of electrical stress. Considering the fact that the batteries in such units rarely require charging more than 1/10 of the time, it is clear that the inverter could be made much simpler and much less expensively if continuous operation could be avoided. Furthermore, the fact that the inverter is running continuously also adds complexity to it because it must be controlled so as not to supply charging current to the battery at all times because then the battery would be overcharged and might, in extreme circumstances, explode. What is usually done is that the control circuitry connecting $E_i$ with $E_s$ (not shown) is used to introduce a phase difference between $E_i$ and $E_s$. The difference between them amounts to the voltage drop across the choke 11 which may be termed $E_L$. The resultant current through the choke 11 will be termed $I_L$. Clearly as is well known in the art, the power transferred to the battery is dependent on the relative inductances of the load and of the inverter circuitry, and on the phase angle between the current $I_i$ at the inverter 12, and $I_L$, the current passing through the choke 11. By varying the phase change between $E_s$ and $E_i$, $\theta$ can also be varied since the choke 11 introduces a 90° phase difference between $E_L$ and $I_L$. Hence, in circuits of the type shown in FIG. 2, power transfer to the battery is controlled by varying the phase angle of the resultant power $E_L I_L$ supplied to the battery.

While this method is workable, it does introduce the additional complexity that the phase angle must be controlled and as mentioned above, has the drawback that the inverter runs constantly, thus necessitating relatively sturdy and expensive construction.

Figure 3:
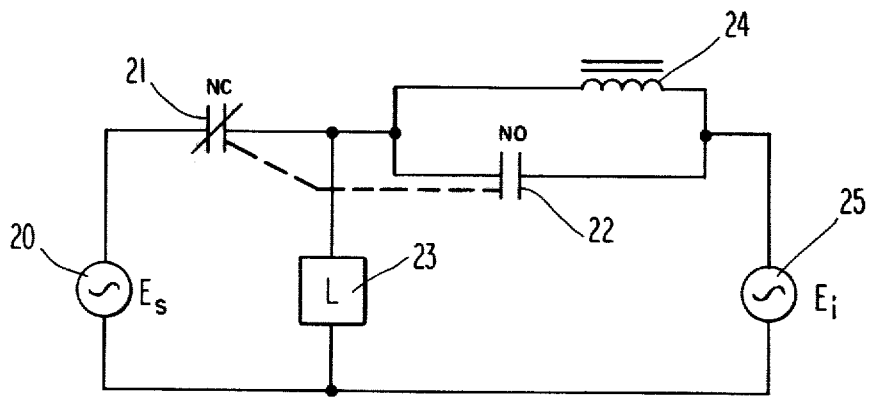
FIG. 3 represents a simplified schematic diagram of the emergency power supply of the invention.

A comparable circuit diagram showing the circuitry of the emergency power supply of the invention is shown in FIG. 3. Again, there is provided a utility supply $E_s$ shown as a generator at 20 and an inverter power supply $E_i$ shown at 25. Again, a load 23 is connected across $E_s$. However, in this embodiment, it will be observed that the load 23 is connected directly across $E_s$ without the interposition of additional circuit elements, apart from a pair of normally closed contacts 21 which are coupled with a pair of normally open contacts 22 and which may comprise an ordinary electromagnetic or solid state relay. Also coupled across the load 23 is supply $E_i$ which, in the normal condition, is in series with $E_s$ although a choke 24 is provided. This choke 24, of course, is comparable to that shown in FIG. 2 as 11. As in FIG. 2, the choke 24 is used to make up a phase difference imposed by control circuitry (not shown) for battery charging to control the amount of power supply to the battery. However, in the circuit shown in FIG. 3, the control circuitry introduces a constant phase angle and the inverter is only run, supplying power to the battery, when called for by the control circuitry. In this embodiment, therefore, the inverter only runs on the order of up to 10% of the time, that is, only when the batteries require charging. In this way the inverter electronics can be made a good deal simpler and less expensively than those in the prior art embodiment shown in FIG. 2.

Clearly, under emergency circumstances, the normally closed contacts open, the normally open contacts close and power is suppled from the battery contained within 25 to the load 23 through the normally open contacts 22 which are now closed. It will be appreciated that the coupled contacts 21 and 22 (a well known transfer switch) are not present in the drawing of FIG. 2 inasmuch as there inverter 12 is operating continuously. This is an important distinction in view of the cost of the components required to complete the circuit of FIG. 2.

Figure 4:
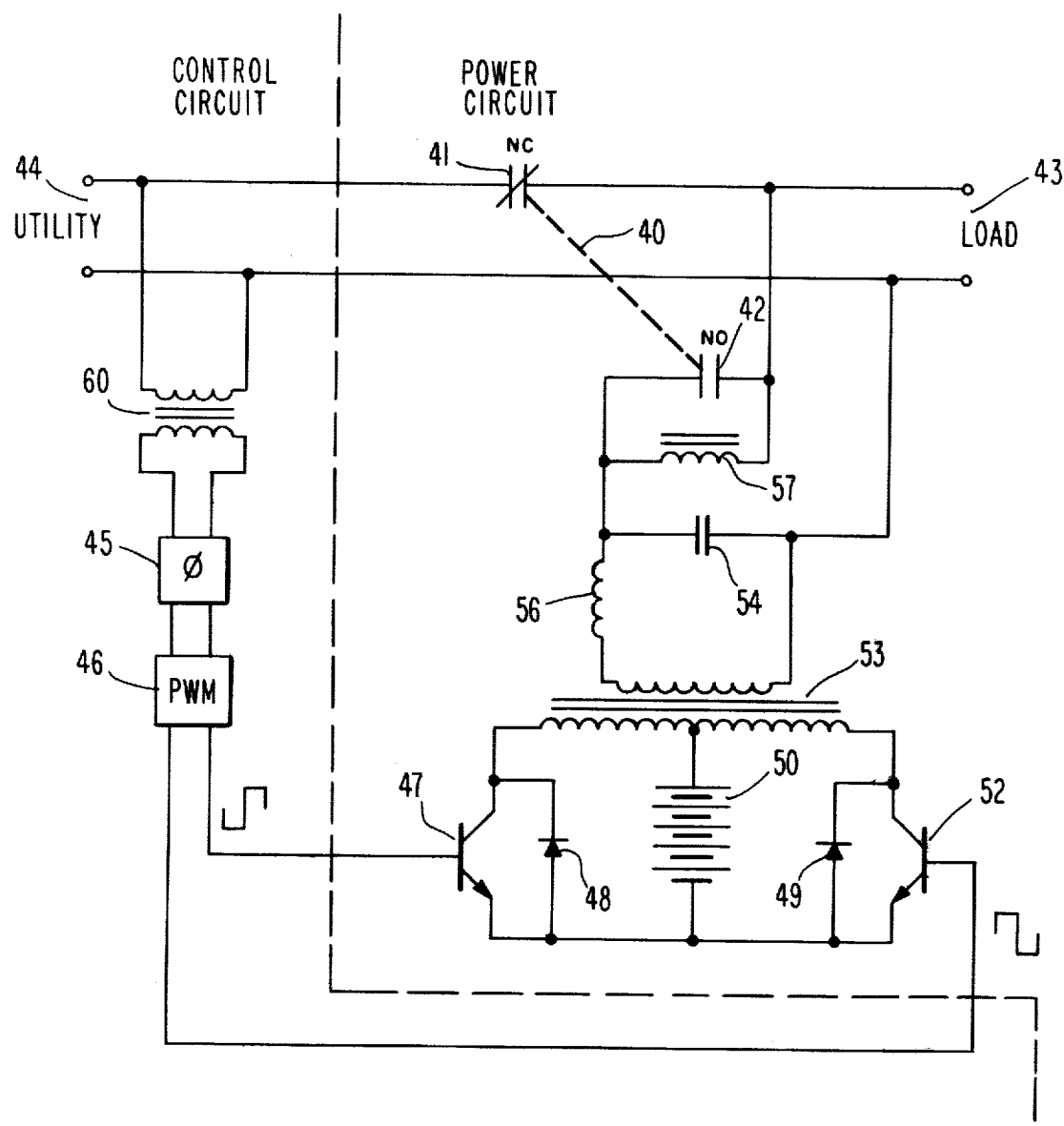
FIG. 4 represents a more complete schematic diagram of the power supply of the invention.

Referring now to FIG. 4, there is shown a more complete schematic diagram of the emergency power supply of the invention. The diagram is divided essentially into two parts, a power circuit on the right and a control circuit on the left. The power circuit on the right is centered about a transformer 53 which takes power supplied to it at utility inputs 44 and isolates it from the battery 50. Under ordinary circumstances, normally closed contacts 41 transmit power from the utility input 44 to the load terminals 43. The normally closed contacts 41 are connected by use of mechanical means 40 to normally open contacts 42. When a power outage occurs the normally closed contacts open and the normally open contacts close, thus providing power to the load terminals 43 from the battery 50. Additional circuit features in the power circuit include a filter inductor 56 and a capacitor, 54 which together form a two pole low pass filter which is used to smooth the output of the inverter in the emergency power mode in a way to be described in further detail later. A charging inductor 57 is also used to smooth the supply of power to a battery. As mentioned above, the transformer 53 isolates the input and the output of the battery charging and inverter circuitry. Battery 50 is connected to the center tap of the transformer 53, its other end being connected to the center of a bridge circuit comprising transistors 47 and 52 and diodes 48 and 49. The transistors 47 and 52 could of course also be replaced with SCR's if this were considered desirable. In either case, the transistors or SCRs are controlled by control circuitry which turns them each on for half the power cycle, thus providing a direct current to the battery 50. Diodes 48 and 49 are used to provide a current path for the flow of reactive power back into the transformer during charging operations.

The control circuitry comprises, in a schematic embodiment, an isolation transformer 60, a phase shifter 45 and a pulse width modulation unit 46. These are used to control the turning on and off of the transistors 47 and 52. On the charging operation, the control circuitry is energized by means indicating the voltage at the battery (not shown). If these means show that the battery requires charging, the pulse width modulation unit 46 controls the turning on and off of the transistors 47 and 52 to allow power to flow into the battery from the AC line input. Phase shifter 45 provides a phase angle difference between the power provided at the input terminals 44 and that provided across the secondary of the transformer 53. This, combined with the phase angle difference introduced by inductors 57 and 56 provides maximum efficiency of power supply to the battery; that is, the phase angle $\phi$ introduced by the phase shifter 45 is controlled so as to keep the resultant current through charging inductor 57 and the voltage thereacross in phase so that the maximum power is delivered to the battery. In this way, the phase angle $\phi$ stays constant at all times and charging of the battery is controlled by simple on/off switching so that the inverter need only be run when the battery in fact requires charging, and during emergency conditions.

Figure 5:
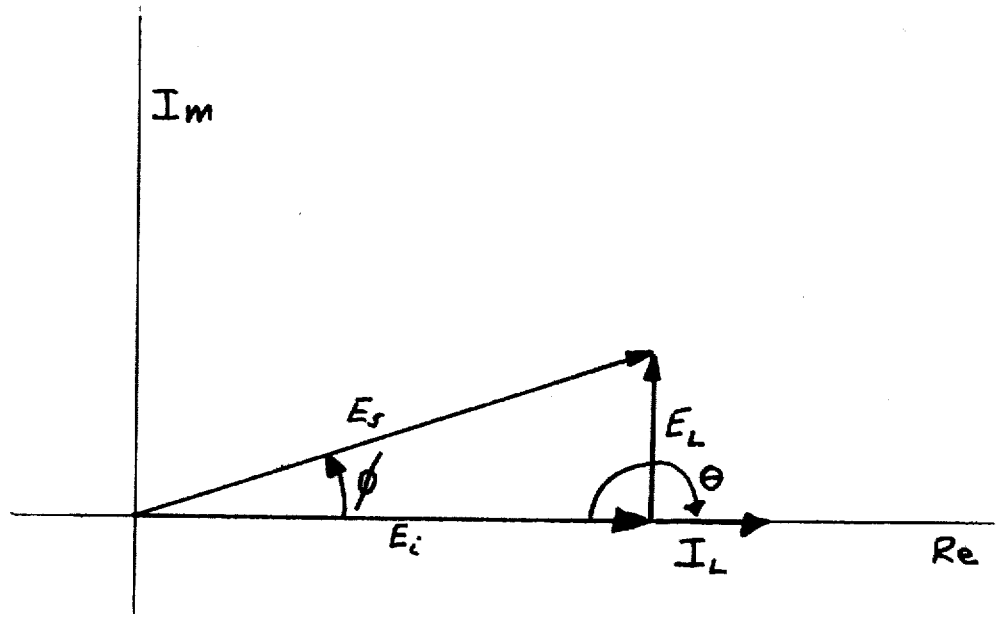
FIG. 5 represents a phase diagram showing the relative flow of power to the battery as a function of the phase angle between the input voltage $E_s$ and the output voltage $E_i$.

Thus, battery charging is accomplished by operating the inverter in synchronism with the AC utility line. The 60 Hz sine wave from the utility line is fed to a line sense transformer 60. The signal is then phase shifted in a lagging direction by phase shifter 45, fed to the pulse width modulator 46 and out to the switching transistors 47 and 52. The phase and voltage of the sine wave that appears across capacitor 54 is, then, a direct function of the phase and voltage that appears at the utility line connection 44. This whole process can be best illustrated by a phasor diagram as shown in FIG. 5. From FIG. 5, those skilled in the art can see that the optimum output voltage of the inverter is a function of the input voltage and phase angle $\phi$. The phase angle is fixed in this system, so the relation between input voltage $E_s$ and output voltage $E_i$ is fixed gain. The result of a lagging phase angle is that power is transferred from the AC line to the inverter. If the phase angle were leading, power flow would reverse. As appears on FIG. 5, power transferred to the battery is equal to $E_i I_L \cos \phi$; clearly this is a maximum when $\theta = 0°$ or $180°$, as it is shown in FIG. 5.

During emergency conditions pulse width modulation unit 46 is needed in order to change the on/off square wave shape provided by the battery 50 and the transistors 47 and 52 to the sinusoidal wave shape required to operate most AC loads. The system used to modulate the square wave shape of a switched DC source to a sinusoidal wave shape can be one of a number of well known prior art expedients. In the preferred embodiment, however, a pulse width modulation unit of the type described in Schonung and Stemmler, Static Frequency Changer with Sub-harmonic Control in Conjunction with Reversible Variable Drives, Brown Boveri Review, August-Sept. 1964, is used. What is done according to that scheme is that the pulse width modulation unit 46 turns the battery on and off at constant voltage, switching polarities at regular intervals, (i.e. at a carrier frequency) but modulates the width of the positive and negative portions of the power supplied in order to provide a net sinusoidal shape to the wave. Thus, the modulation frequency is chosen so as to provide the desired frequency of alternating current, in this embodiment 60 Hz. The two pole low pass filter provided by capacitor 54 and inductor 56 then operates to integrate the square pulses provided by the battery and the pulse width modulation unit 46 in order to provide a true sinusoidal wave shape. Clearly, the values of the capacitor and the inductor can be chosen in accordance with well known criteria in order to provide a proper cut-off frequency. In a preferred embodiment, the cut-off frequency of the output filter is 400 Hz and the carrier frequency is 4,000 Hz. Since a two pole filter is being used, the slope of the filter cut-off is 12 db per octave; as the frequency difference between 400 Hz and 4,000 Hz is approximately 3⅓ octaves, the carrier frequency is filtered to on the other of -40 db, hence providing a well-shaped sine wave output. The choice of carrier frequency as well as modulation frequency can, of course, be chosen to suit any particular set of requirements. However, it is clear as well that the carrier frequency should be as high as possible to keep it as far as possible away from the cut-off frequency for a good output wave form, while the cut-off frequency should be as high as possible to keep the physical size of the components small and the transient response of the inverter good. These conflicting requirements necessarily must be compromised; as discussed above, in the preferred embodiment, the cut-off frequency is 400 Hz and the carrier frequency 4,000 Hz.

If the circuit is used as described above, the inverter frequency will be the same under battery charging conditions as in the emergency mode. This is undesirable because the 4 kHz operating frequency will produce a sound audible to the human ear, in fact a rather annoying sound, this frequency being in the very center of the audible range. Therefore, circuitry is provided (not shown) to raise the carrier frequency to frequencies beyond the audible spectrum. In a preferred embodiment 16 kHz was chosen, which is not usually audible to the human ear. However, frequencies as high as 150 kHz are practical with modern transistors. Since the inverter operates at a reduced current level under battery charging conditions it is not prohibitive from the power standpoint to raise the frequency. The carrier frequency may or may not be changed under emergency conditions as well; since power is then of paramount importance, it is desirable that the carrier frequency be kept relatively low. Hence, in a preferred embodiment, it remains 4 kHz during emergency conditions. Of course, one is not nearly so annoyed by noise pollution during emergency conditions as otherwise; and indeed, the audible hum provided may be a reassuring indication that the unit is working.

It will be appreciated that while the invention has been described in terms of specific circuitry, the skill of the art is such as to permit a wide variety of modifications and improvements to the scope of the invention without departing from its essential aim. Therefore the embodiments described above should be considered exemplary only and not limiting the extent of the invention, the scope of which is defined more properly by that of the following claims.

I claim:

1. An emergency power source comprising:
   a battery;
   inverter means for conversion of alternating current utility power of a first comparatively low frequency to direct battery charging current under normal conditions, and for inversion of direct to alternating current under emergency conditons;
   a switch for transferring the source of power delivered to load terminals from input terminals to inverter connections upon detection of emergency conditions; and
   control circuitry;
   wherein battery charging is accomplished by switched operation of said inverter at a preset phase angle and synchronous to said utility power wave form, to provide direct current to said battery, the power supplied to said battery being controlled by comparatively high frequency switched modulation of said direct current, asynchronous to said power wave form.

2. An emergency power system, comprising:
   a battery;
   switch means for transferring a load connection from utility terminals to said battery upon detection of failure of the utility;
   a power circuit comprising filter means, transformer means, and single switched inverter means, said inverter means being adapted to supply said battery from utility power under ordinary circumstances and supply a load from said battery under emergency conditions; and
   a control circuit comprising an isolation transformer, a phase shifting circuit and a wave shaping circuit;
   wherein said control circuit provides a fixed phase difference between utility alternating current supplied to the power system and the current supplied to said switched inverter means, whereby said inverter is controlled to rectify said utility current, and the power delivered to said battery is controlled by said fixed phase difference, and the energy delivered to said battery is controlled by the length of time of operation of said inverter.

3. An emergency power supply according to claim 1 or 2 wherein the control circuit provides pulse width modulation to the power delivered to a load under emergency conditions.

4. An emergency power supply according to claim 3 where the carrier frequency of said pulse width modulation means under battery charging conditions is different than during emergency conditions.

5. An emergency power supply according to either of claims 1 or 2 wherein said battery is charged only when the control circuitry detects that its charge is below a predetermined lower limit, whereby said inverter is run only during battery charging and emergency power conditions.

* * * * *